June 21, 1932.  H. B. KIPPER  1,863,751
PROCESS OF RECOVERING SODIUM, POTASSIUM, AND
MAGNESIUM CHLORIDES FROM NATURAL BRINES
Filed July 5, 1929
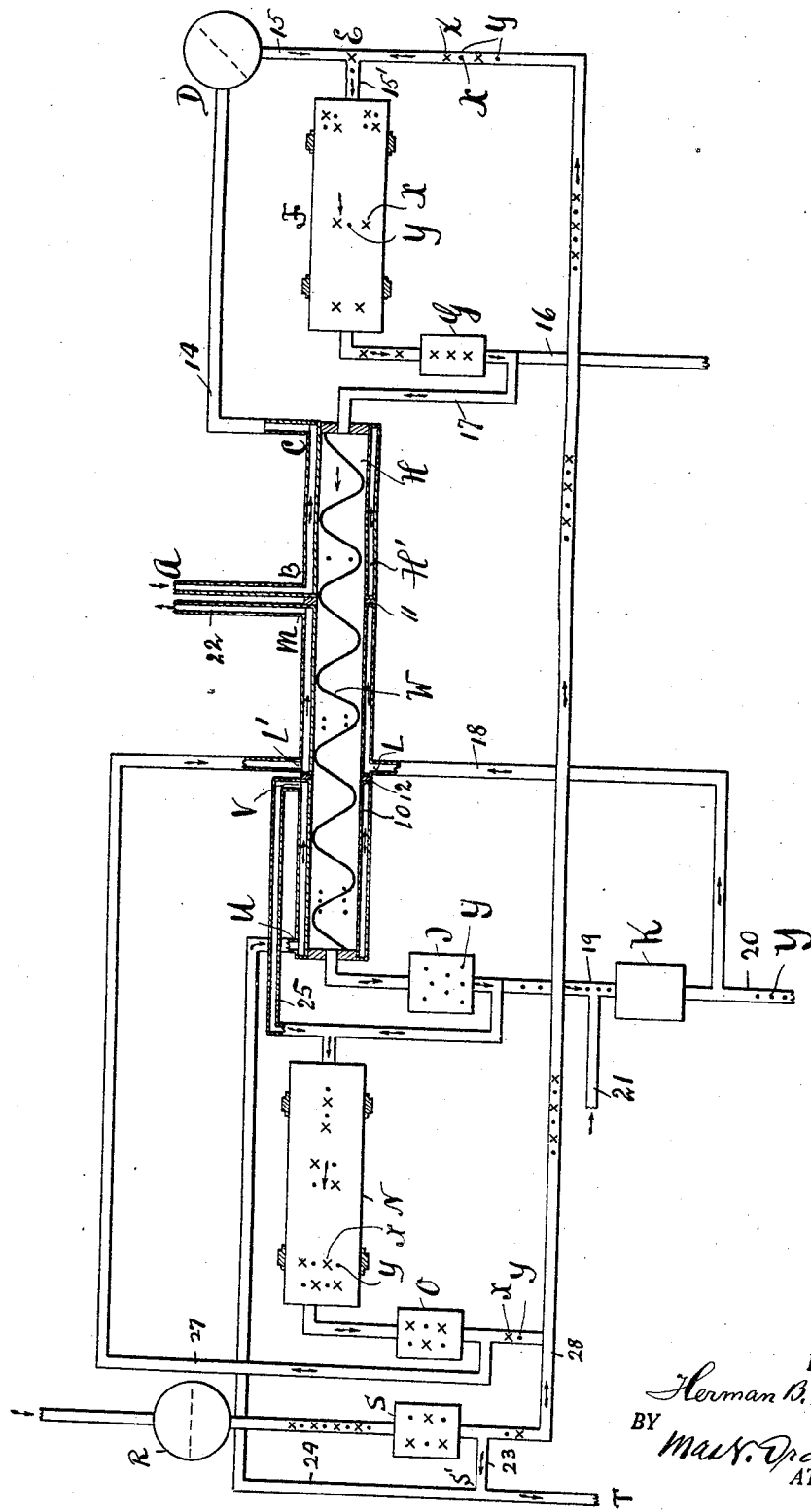
INVENTOR.
Herman B. Kipper
BY
ATTORNEYS.

Patented June 21, 1932

1,863,751

UNITED STATES PATENT OFFICE

HERMAN B. KIPPER, OF NEW YORK, N. Y.

PROCESS OF RECOVERING SODIUM, POTASSIUM AND MAGNESIUM CHLORIDES FROM NATURAL BRINES

Application filed July 5, 1929. Serial No. 375,908.

The present invention relates to a method of separating the chlorides of sodium, potassium and magnesium from brines such as those obtained from the Great Salt Lake desert and which contain principally the above named chlorides in solution in about 1.25% of the latter two salts and 18% for the sodium salt. The solution is practically saturated with the said sodium salt.

I am fully conversant with the methods employed in securing potassium and magnesium chlorides from the Strassfurth deposits and also the many methods hitherto used for the recovery of these salts from Utah salt brines. However, the inefficiency of the foregoing processes is common knowledge.

To overcome the aforementioned drawback I have developed a process for recovery of said salts, which constitutes the subject of my invention.

This process is based on the counter current heat principle. At one end of the apparatus employed for carrying out my new process, the liquid or brine used is heated practically to the boiling point or just below such temperature, and at the other end thereof artificial cooling is used whereby the brine temperature is reduced to about 0° C. The respective liquors or brines in a counter current fashion are made to gradually give off their heat or to cool one another down as required, by either direct or indirect action on one another.

By this process the separation of the salts of the brines is accomplished in a highly efficient manner.

A brief description of the process for the separation of the sodium, potassium and magnesium chlorides from one another when contained in the same solution or brine follows. The present description applies more particularly to a brine of the nature of Utah salt brine or at least the concentrations of this brine. However the methods are, of course, of general application.

As potassium and magnesium are the two valuable constituents of the Utah brines and as these are not in a saturated condition in the said brine, the latter is first evaporated by "solar evaporation," i. e. by use of the heat from the sun and by use of the winds etc. up to a point where it becomes saturated with potassium chloride.

In order to render the ground employed for solar evaporation more impervious, I first treat the same with an alkali or alkaline solution, as ammonium hydroxide, lime water, sodium hydroxide, sodium carbonate, etc. In this manner part of the magnesium chloride with which the ground is largely saturated is converted to a magnesium hydroxide or other basic magnesium salt. This forms magnesium cementatious materials, as the well known magnesium oxy-chloride cement. The ground is thereby rendered very nonporous or impervious to water or to the brines in question.

During this primary evaporation eighty to ninety percent of the sodium chloride or common salt, are precipitated out and about the same percentage of water is evaporated or eliminated from the process. The "brine" then contains about 120 to 130 grammes per liter of potassium chlorides and about the same percentage of magnesium chloride. It is then pumped to the refinery operation in which operation the separation of these salts in question is brought about.

My process will be more fully understood by reference to the accompanying drawing illustrating diagrammatically the apparatus and system in which the refining operations are carried out. The right hand end in the present figure represents the hot end of the apparatus and the left hand end, the cold end.

This apparatus comprises an indirect heater D such as a steam heater or the like, a rotary or any other suitable type of hot dissolver F, centrifugal or other types of filters G, I, K, O, and S, a crystallizer H, a rotary cold precipitator N or any other type of precipitator and the refrigerating plant (not shown) and a cooler R.

The various parts of apparatus enumerated above are of any conventional construction and design and are shown in their relative relationship to one another.

In particular, however, the crystallizer has an inner portion H and an outer jacket H' separated from said portion H by a metal partition 10 and divided into three separate independent compartments by means of separating walls 11 and 12 respectively. A suitable worm W operates in the portion H for a purpose hereinafter specified. If desired, the crystallizer may be formed by joining three separate crystallizers end to end. However, the type employed is immaterial.

The "solar concentrated brine", say of about 25° C., is passed into the outer compartment of the crystallizer at A and then travels from B to C in counter current direction relative to the hot brine flowing in the inner compartment H. The temperature of said brine in the compartment rises to about 60° C. From the point C it passes through a pipe 14 to the indirect heater D, in which it is heated to about 100° and flows from said heater through a pipe 15 to a point E where it meets a mixture of sodium and potassium chloride crystals secured subsequently in the process, as will be presently described, and suitably conveyed to said point. From E the hot brine together with the mixed crystals is led through pipe 15' to the dissolver F, which may be in form of a rotating drum suitably driven and which agitates the mixture. In this part of apparatus the potassium chloride is dissolved and the sodium chloride remains in crystal form. This is due to the fact that the brine dissolves nearly 300 grams of potassium chloride at 100° C. per 1000 grams of water contained in the brine, whereas at 25° C., only 120 grams of potassium chloride are soluble in it. With sodium chloride the solubilities are 195 grams at 25° C. and 170 grams at 100° C. per 1000 grams of water. The solubility of the sodium chloride, it will, therefore, be seen, is reversed at the two respective temperatures, or in other words, sodium chloride is more soluble at 25° C., than at 100° C. in this brine, so that a small amount of the latter salt actually precipitates under the higher temperature. The relative precipitation is shown diagrammatically in the drawing, wherein the potassium chloride crystals are represented by small dots Y and the sodium chloride crystals by small crosses X. It will be seen that at the right hand end of the dissolver both crystals Y and X are present whereas as the flow progresses towards the left hand end the potassium chloride crystals Y diminish in quantity.

From the dissolver F the precipitated sodium chloride crystals and brine solution while still hot are passed through the filter G, which may be a centrifugal filter and which separates the said crystals from the brine solution. The said crystals of sodium chloride may be led to storage from said filter by any suitable conveyor 16. The brine is led from the filter G to the inner compartment H of the crystallizer by pipe 17. In said central portion the brine is gradually cooled down while heating the initial entering brine in the jacket H'. During the cooling the potassium chloride begins to precipitate out because of the differing solubilities at the different temperatures above referred to. The said solution and crystals are carried through the apparatus by the rotating worm W or otherwise suitably conveyed depending upon the type of crystallizer employed.

In the next section of the crystallizer or in a separate crystallizer the hot brine is still further cooled by means of wash water flowing into the compartment through pipe 18 and obtained from another portion of the process or other cooling liquors, as the brine from the cold precipitator. This further cooling causes further precipitation of potassium chloride crystals, which when the brine reaches the next section of the compartment H' it is cooled to between 0–10° C. by means of a brine coming from the cold end of the apparatus flowing into said last named section.

During the cooling process from 100° C. to let us say, 5° C. the solubility of potassium chloride in the brine has been reduced from practically 300 grams of potassium chloride per 1000 grams of water contained in the brine to 70 grams. A precipitation of potassium chloride crystals has, therefore, taken place in keeping with these figures. The progressive increase in precipitation from the right to the left end of said crystallizer is indicated by the increasing number of crystals Y from right to left in said precipitator.

The brine or suspension, while still cold is now led to the filter I, which is of the same type as filter G and the potassium chloride crystals Y are then passed by a suitable conveyor 19 to the washer K, which may be of similar type of filter to filter G. In said washer said crystals are washed and freed from adhering brine and then led by means of a suitable conveyor 20 to storage. The wash water entering said filter K through a pipe 21 is led from said filter through pipe 18 to a section of the compartment H' entering the same at L where it serves for cooling the oppositely flowing brine solution in the portion H of the said crystallizer, as already described. The said wash water mixes with other cooling liquors entering at L', as will be hereinafter described, and the combined liquors move in said outer compartment H', and out of the latter at M, whence it may be led through pipe 22 to a suitable vacuum or solar evaporator for the recovery of the salts in the said wash water which is subsequently used co-mingled with other brines.

From the filter I the brine freed from potassium chloride crystals Y is passed to the cold precipitator N which may be a rotary cylinder or other form of apparatus that causes stirring of the comingled brines and where it meets a cold brine containing a high percentage of magnesium chloride, 500 grams of magnesium chloride to 1000 grams of water. The said cold brine coming from the magnesium chloride reservoir (not shown) flows through the refrigerator (not shown) and cooler R where it is cooled to 0° C. From said cooler R the cold brine is led through rotary filter S where sodium and potassium crystals X and Y which have precipitated out of the magnesium chloride solution are removed and fed to a conveyor of any suitable type which conveys said mixed crystals to the point E for mixture with the hot brine entering the hot dissolver F. The cold brine solution emerging from filter S is led through pipe 23 to the point S' where a portion of the magnesium chloride brine is led off to final evaporation at point T, whereby magnesium chloride crystals are recovered.

The rest of said magnesium chloride brine is led through pipe 24 to the point U of the left section of said crystallizer H. Thence it flows through the outer compartment H' towards the right, cooling the liquid which flows through the inner compartment of the crystallizer. It then emerges from said crystallizer at point V whence it is led by pipe 25 to the entrance N' of the cold precipitator N where the said magnesium chloride brine, 500 grams of magnesium chloride per 1000 grams of water concentration, meets brine coming from the filter I and containing both sodium and potassium chlorides in solution.

The comingled brine now contains somewhat over 300 grams of magnesium chloride per 1000 grams of water at the low temperature of operation 0° C. to 10° C. The solubilities of both sodium and potassium chloride are very low, about 30 to 40 grams per 1000 grams of water for both these salts, and, therefore, both the latter salts precipitate out in said precipitator which agitates the comingled brine to facilitate and increase the precipitation as illustrated by the dots Y and crosses X as before.

From said precipiator N the solution and precipitation are passed to filter O wherein the sodium and potassium crystals are removed and fed to said conveyor 28. The cold brine leaving said filter O has a concentration of about 300 grams of magnesium chloride per 1000 gram of water and is led through pipe 27 to the said point L' of the outer compartment H'. Therein it mixes with said wash water as previously described and cools the brine flowing in compartment H of the crystallizer. The said brine and wash water mixture is led off for further evaporation at point M from its content of approximately 300 grams of magnesium chloride per 1000 grams of water to one having a content of 500 grams and then it is returned to the operation and cooled in the artificial cooler R where the final small percentage of sodium and potassium chlorides precipitate out and are recovered in filter S as above described.

If a greater amount of "solar evaporated brine" than that required for the preparation of the potassium chloride, is on hand, this may be passed directly to the "cold precipitator" instead of being utilized completely in the "hot dissolver". Also for a somewhat higher efficiency in the processing, the brine leaving the cold precipitator N may be passed through the second or intermediate section of the crystallizer as described.

This however is not essential to secure an operative process.

During the winter months, the natural cold brine might of course be used for cooling purposes in place of the cooling artificially produced by mechanical refrigeration apparatus. Again the initial hot brine, after being freed from sodium chloride crystals, might be directly artificially cooled instead of by counter-current cooling for precipitation of potassium chloride. Such a step would, however, be a less efficient one than that initially described by me.

The marked advantages of the processing are dependent on the use of artificial supercooling together with concentrated brine, for "salting out" at one end of the apparatus, and the use of hot brines at the other end for dissolving potassium chloride, and the gradual bringing of these brines together in such a manner that the energy utilized in heating the brines and that utilized in cooling the same so neutralize each other as to bring about efficient crystallization of potassium chloride in the intermediate steps of the process. In other words, efficient solution has been established at the "hot end" and efficient "salting out" at the "cold end" of the apparatus, and efficient crystallization in the intermediary steps. This affords very compact processing with consequent diminution of cost below the cost of the present known process.

It will be distinctly understood that artificial mechanical refrigeration is used in carrying out this processing.

In order clearly to define our refrigeration apparatus it might be better to describe the same by refrigeration means secured from the mechanical compression and expansion of gases, vapors or liquids.

What I claim is:—

1. The recovery of sodium potassium and magnesium chloride from natural brines containing these salts in aqueous solution and having high percentage of sodium chloride, comprising the steps of first evaporating said brine by solar heat to a point where the brine becomes saturated with potassium chloride and the greater percentage of sodium chloride has been precipitated out and the greater percentage of water evaporated, then heating the solar concentrated brine, saturated as to potassium chloride at the normal atmospheric temperature, for solution of an increased percentage of potassium chloride, soluble at a higher temperature, from a mixture of sodium and potassium chlorides subsequently obtained in the process, then filtering off the undissolved sodium chloride, then cooling the brine to from 5° to 15° C., then filtering off the precipitated potassium chloride, then mixing the residual brine with a brine containing magnesium chloride in concentration of about 500 grams per 1000 grams of water and artificially cooled to between 5° and −5° C. by utilizing the compression and expansion of fluids for the production of cold, then filtering off the sodium and potassium chloride crystals precipitated from the said treatment, then evaporating the comingled brines to substantially the original magnesium chloride concentration, then artificially cooling to between 5° and −5° C. by utilizing the compression and expansion of fluids for the production of cold the latter brines for precipitating the residual sodium and potassium chloride crystals therein contained, then filtering off the latter salt crystals and securing crystalline magnesium chloride by further evaporation of the said concentrated brine.

2. The recovery of sodium potassium and magnesium chlorides from natural brines containing these salts in aqueous solution and having a high percentage of sodium chloride, comprising the steps of first evaporating said brine by solar heat to a point where the brine becomes saturated with potassium chloride and the greater percentage of sodium chloride has been precipitated out and the greater percentage of water evaporated, then heating the solar concentrated brine saturated as to potassium chloride at the normal atmospheric temperature, for solution of an increased percentage of potassium chloride, soluble at a higher temperature, from a mixture of sodium and potassium chlorides subsequently obtained in the process, then filtering off the undissolved sodium chloride, then artificially cooling the brines to between 5° and 15° C. by application of counter current cooling action secured from other brines subsequently produced in the process and artificially cooled to between 5° and −5° C., by utilizing the compression and expansion of fluids for the production of cold then filtering off the precipitated potassium chloride, then mixing the residual brine with the brine subsequently obtained in the process and artificially cooled to between 5° and −5° C., by utilizing the compression and expansion of fluids for the production of cold, and containing magnesium chloride in concentration of about 500 grams per 1000 grams of water, then filtering off the sodium and potassium chloride crystals precipitated by the said treatment, then evaporating the comingled brines to substantially the original magnesium chloride concentration, then artificially cooling to between −5° and 5° C. utilizing the compression and expansion of fluids for the production of cold the latter brines for precipitating the residual sodium and potassium chloride crystals therein contained, then filtering off the latter salt crystals and utilizing part of the artificially cooled high percentage magnesium chloride containing brines for cooling off the aforementioned hot brines used in the process and employing another part for securing crystalline magnesium chloride by further evaporation.

3. The recovery of sodium, potassium and magnesium chlorides from natural brines containing these salts in aqueous solution, and from brines more especially containing a relatively higher percentage of sodium chloride, by first evaporating the said brine by solar heat to a point at which the brine becomes saturated with potassium chloride and 80% to 90% of the sodium chloride has been precipitated out and 80% to 90% of the water evaporated, then heating of the latter solar concentrated brine, saturated with and containing about 120 grams of potassium chloride to 1000 grams of water at 25° C. for further solution at 100° C. in the said brine of potassium chloride up to 300 grams per 1000 grams of water from a mixture of sodium and potassium chlorides subsequently obtained in the process, filtering off the undissolved sodium chloride, cooling off the brine to from 5 to 15° C. by artificial cooling, as by application of counter-current cooling action secured from other brines subsequently produced in the process and artificially cooled to from 5° to −5° C., filtering off the precipitated potassium chloride, mixing the brine with a brine subsequently obtained in the process and artificially cooled to about 0° C., and containing about 500 grams of magnesium chloride per 1000 grams of water, filtering off the sodium and potassium chloride crystals precipitated, for treatment by the hot brine as aforementioned, evaporating the comingled brines containing about 300 grams of magnesium chloride per 1000 grams of water to substantially the original magnesium chloride content aforementioned, artificially cooling to 0° C. the latter brine for precipitating the residual sodium and potassium chloride crystals therein contained, filtering off the latter salt crystals and utilizing part of said artificially cooled high percentage magnesium chloride brine for cooling of the aforementioned hot brine used in the process and employing another part thereof to secure crystalline magnesium chloride by further evaporation.

4. The recovery of sodium, potassium and magnesium chlorides from natural brines containing these salts in aqueous solution and having a high percentage of sodium chloride, comprising the steps of first evaporating said brine to a point where the latter becomes saturated with potassium chloride and the greater percentage of sodium chloride has been precipitated out and the greater percentage of water evaporated, then heating the concentrated brine, saturated as to potassium chloride at normal atmospheric temperature, for solution of an increased percentage of potassium chloride from a mixture of sodium and potassium chlorides subsequently obtained in the process, then filtering off the undissolved sodium chloride, then cooling the brines to about between 5 and 15° C., then filtering off the precipitated potassium chloride, then mixing the residual brine with a brine subsequently obtained in the process which has been artificially cooled to about 0° C. and which contains a high percentage of magnesium chloride, then filtering off the sodium and potassium chloride crystals precipitated from said latter treatment, then evaporating the comingled brines to a high percentage of magnesium chloride content and then artificially cooling the latter brines to from −5° to 5° C. for precipitation of the residual sodium and potassium chloride crystals and securing crystalline magnesium chloride by further evaporation of said concentrated brine.

In testimony whereof I affix my signature.

HERMAN B. KIPPER.